June 14, 1966  R. J. COWLES  3,256,471
CERAMIC CAPACITOR
Filed Oct. 11, 1963
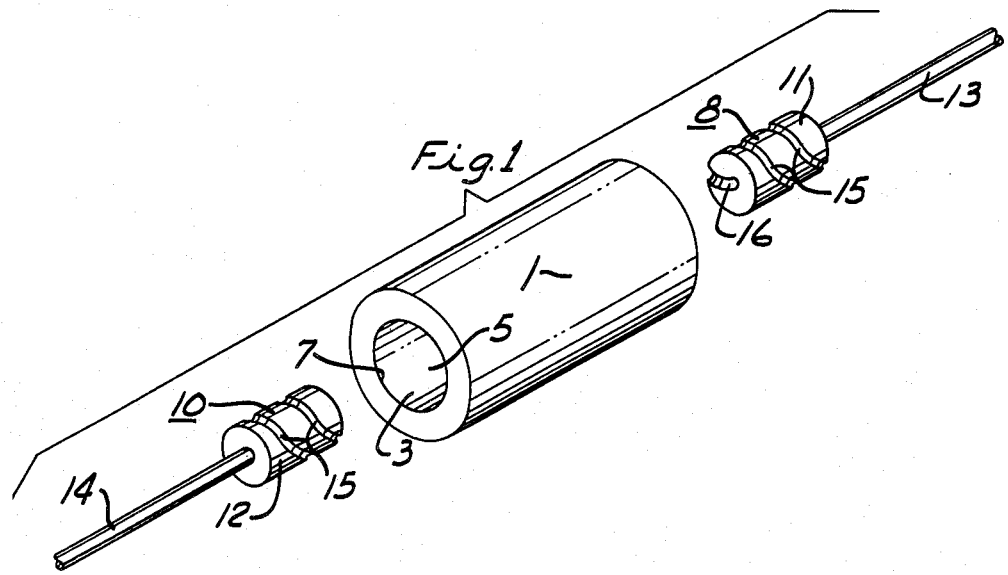
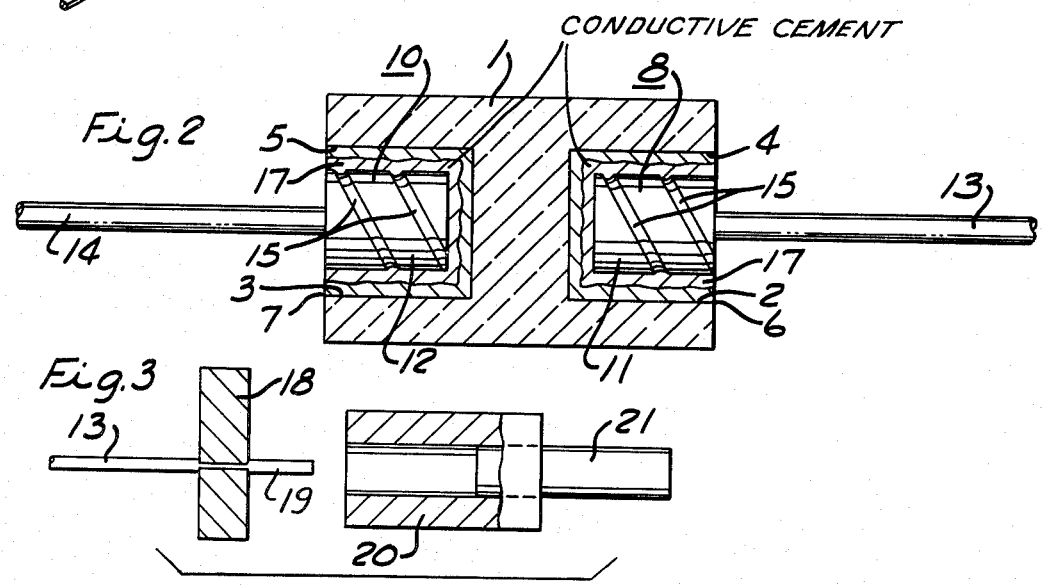
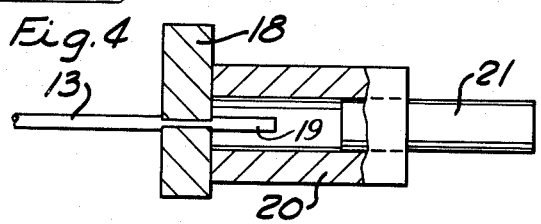
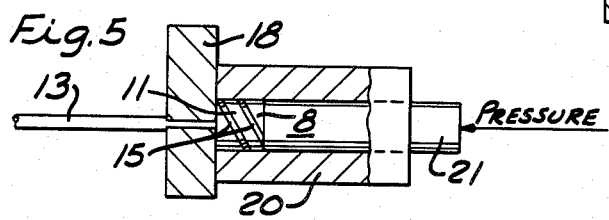
INVENTOR.
ROBERT JOHN COWLES
BY
*William D. Carothers*
HIS ATTORNEY 3,256,471
CERAMIC CAPACITOR
Robert John Cowles, Ridgway, Pa., assignor to Quality Components, Incorporated, St. Marys, Pa., a corporation of Pennsylvania
Filed Oct. 11, 1963, Ser. No. 315,602
1 Claim. (Cl. 317—258)

This invention relates generally to capacitors and a method of making the same and more particularly to a new and improved axial lead tubular type capacitor.

The principal object of this invention is the provision of a capacitor possessing highly desirable electrical characteristics and yet is simple in construction and economical to manufacture.

Another object of this invention is the provision of cylindrical dielectrics having a coaxial recess in each end into which axial lead type terminals are placed. This cylindrical dielectric body construction provides a longer surface leakage path between the electrodes of the capacitor as compared with conventional disc and tubular capacitors. This capacitor is able, therefore, to withstand higher voltages impressed at the electrodes.

The presence of moisture, dirt and other foreign matter collecting upon the surface of the capacitor body may reduce the capacitor's dielectric strength by forming a conductive path between the electrodes. However, the provision of a longer leakage path reduces possibility of this type of breakdown.

Another object of this invention is the provision of a cylindrical construction which reduces voltage stress at the edges of the electrodes. The concentration of electrical stress at edges of the electrodes is reduced because the edges of the electrodes are not in a close relationship to each other as found in conventional disc type capacitors. As a result the possibility of dielectric breakdown is reduced. The cylindrical recesses in which the electrodes are coated are ideal in distribution of electrical stress. The electrode dielectric separation is the smallest at the bottom of the recess. This dielectric separation becomes longer from the bottom of the recess to the inside edge and end of the cylindrical body. The electrode edges at the inside edge of the recess have the largest dielectric separation thereby reducing dielectric breakdown in the area where it is most likely to occur. This type of capacitor construction, then, increases the efficiency of the capacitor as well as its life.

Another object of this invention is the provision of a cylindrical dielectric construction with coated electrode recesses being self-insulated from the atmosphere and other circuit components due to insertion of the cylindrical terminal head in the recess of the dielectric body itself. Many exterior insulations have the disadvantage of dirt and moisture penetration which degrades the electrical properties of the capacitor. This type of construction eliminates the need for any exterior insulation.

Another object of this invention is the provision of an axial lead type construction desirable for use with automatic circuit board insertion machinery.

Another object of this invention is the provision of solid type terminal heads thereby reducing electrode inductance which is desirable at high frequencies. The solid terminal head prevents burn spots and holes and functions as a heat sink when the capacitors are soldered into a circuit.

Another object of this invention is the provision of spiral grooves or indentations in the terminal heads which aid in obtaining good adhesion upon cementing the head in the coated electrode recess.

Another object of this invention is the use of a thermosetting conductive cement to secure the terminal head of the capacitor within the coated electrode recess. Such a cement is epoxy conductive cement which has not only good affinity for metal, but also good affinity to other materials which are not solderable, but possess desirable characteristics. The use of this type of cement also eliminates displacement of the terminal head in the coated electrode recess due to intense heat during the soldering operation of circuit assembly or during circuit operation. Epoxy conductive cement eliminates the possibility of dissolving the silver electrode material as might result if solder were used in place of this cement. Furthermore, epoxy cement possesses high strength upon curing and can be made with the proper viscosity without use of a solvent thereby eliminating blistering and production of byproducts upon curing which may reduce the good electrical characteristics of the capacitor.

Another object of this invention is the construction of capacitor which is durable and mechanically rugged as compared to the conventional thin-walled tubular and disc capacitors.

Other objects and advantages appear hereinafter in the following description and claims.

The accompanying drawings show for the purpose of exemplification without limiting the invention or the claim thereto certain practical embodiments illustrating the principles of this invention wherein;

FIG. 1 shows an exploded and enlarged view of the capacitor comprising this invention.

FIG. 2 shows an enlarged axial cross sectional view of the capacitor comprising this invention.

FIG. 3 shows the apparatus for producing terminal heads used with the capacitor comprising this invention.

FIG. 4 shows the apparatus for producing terminal heads before the pressure forming operation.

FIG. 5 shows the apparatus for producing terminal heads after the pressure forming operation.

Referring now to the figures the cylindrical dielectric cylindrical body 1 is a ceramic material. At the ends of this cylindrical body 1 there is formed the recesses 2 and 3. The principal purposes of the ceramic body as far as capacitor construction is concerned is to insulate the two electrodes 4 and 5 of the capacitor from one another and also insulate them from other circuit components and support them in capacitive relation to each other. Furthermore, due to the construction of this ceramic body 1 the electrodes are protected from atmospheric elements such as moisture, dust and any other foreign material which could affect the electrical properties possessed by the electrodes 4 and 5.

The cylindrical dielectric body 1 is made first by blending together the required ceramic powder including metallic oxides in various proportions depending on the required capacitance to be obtained, the temperature coefficient of capacity required, and the Q-value desired after the ceramic body has been baked. A temporary binder such as phenolic resin or wax emulsion in water is added to the mixture of ceramic powders in order to temporarily hold the blended elements in a homogeneous mass until the baking operation is completed. The temporary binder will burn out completely during the baking operation and, therefore, is used only to maintain the form of the ceramic body in its required shape prior to the high fusion temperatures used in the baking operation.

The ceramic powders used in this blend can be such metallic oxides such as barium titanium oxides ($BaTiO_3$) and titanium oxide ($TiO_2$).

After the binder is thoroughly mixed in the ceramic powders, the mixture is then dried and granulated to the proper mesh for the molding operation. The ceramic powder granules are then placed in a cylindrical steel mold. The steel mold has end punches which have a projection on their face for forming the body and the recesses in the ends of the ceramic body 1. The end punches are inserted in each end of the mold, and pressure is applied resulting in the formed ceramic body 1. The ceramic body 1 is then ejected from the mold and is ready for the baking operation.

The baking operation may be carried out in an electrically heated furnace having an oxidizing atmosphere at temperatures between 2100° F. and 2500° F. However, it should be realized that the time and temperature of this baking operation is dependent upon the size and shape of the particular ceramic body being processed. After the baking operation the ceramic body 1 possesses a vitreous quality and possesses great mechanical strength.

The electrodes 4 and 5 are then formed inside the recesses of the ceramic body. The electrodes 4 and 5 are coated upon the bottom and the cylindrical side walls up to the inside edges 6 and 7 of the recesses 2 and 3 respectively. The preferred electrode material is silver because of its excellent conductivity ability and also because of the higher Q-values obtainable in the capacitor. Furthermore, silver makes more intimate contact with the ceramic dielectric.

The silver electrodes are made by coating these surfaces 2 and 3 with a commercial silver paste which consists of pure silver powder, glass frit, and temporary organic binders. After coating, the parts are baked at a low temperature to expel any volatile thinners which may blister the electrodes reducing their intimate bond with the ceramic dielectric upon heating the ceramic body to a higher temperature. After this baking by heating at lower temperature, the ceramic body 1 with the silver coated electrodes is then placed in an oven at a temperature of about 1200° F. for approximately twenty minutes. The silver glass frit blend melts and adheres to the ceramic surface of the recesses 2 and 3 thus forming conductive metallic electrodes 4 and 5 firmly bonded to the ceramic.

The terminals 8 and 10 consist of substantially solid cylindrical terminal heads 11 and 12 and stems 13 and 14 which protrude from the center of one end of the terminal heads 11 and 12 respectively. Spiral or circumferential grooves or indentations 15 are formed during the coiling process on the perimetral surface of the cylindrical heads 11 and 12 which spiral toward the ends of the terminal head. The spiral groove or indentation 15 terminates at 16 in the center of the head. The terminal heads 11 and 12 may be formed from a single copper wire. One end of this copper wire is upset in a cavity which forms the coiled terminal head. Thus the wire stems 13 and 14 are integral with the terminal heads 11 and 12 respectively. The terminal connections 8 and 10 may then be tin coated for good solderability when the finished capacitor is assembled in a circuit.

FIGS. 3, 4 and 5 show the manner in which the terminal heads 11 and 12 are formed. A copper wire such as the stem 13 is placed in the clamp 18 with a sufficient amount of its length projecting as shown at 19 to form a terminal head by compression coiling. An open cylinder die 20 is provided with a piston 21 at one end. As shown in FIG. 4 the open end of the cylinder 20 is placed over the end 19 of the wire 13 and in contact with the smooth and flat face of the clamp 18. The cylinder 20 and the clamp 18 are held in fixed relationship to each other with suitable clamp means. Pressure is then applied to the piston 21, and as shown in FIG. 5, the piston causes the wire to coil. The spiral grooves 15 are merely the gaps or grooves formed between adjacent wire turns when coiled or pressed into a head. Coiling and upsetting the wire 13 produces the spiral groove 15.

The terminal heads 11 and 12 are secured within the recesses 2 and 3 to the silver electrodes 4 and 5 by using a thermosetting conductive cement 17 such as epoxy conductive cement. Such a cement is used in the construction of this type of capacitor because epoxy resin used in this cement possesses high strength upon curing which is needed for good mechanical axial terminal anchorage. Furthermore, epoxy cement has great affinity for metal as well as nonmetallic materials which also may be good electrode materials such as colloidal graphite or air dry metallic conductive coatings. Such electrode materials are not solderable which is not a necessary requirement when epoxy cement is employed.

Epoxy cement is thermosetting and is available in the proper viscosity without the use of any solvent which otherwise might cause blistering if the solvent is not completely removed before the curing process. Also other types of cement may produce other unwanted byproducts in the curing process and thereby reduce the good electrical characteristics of the capacitor. Silver powder is used as a filler in the thermosetting cement not only because of its high conductivity but also because of the resultant high Q-value in the capacitor. Furthermore, silver has the good characteristic of resisting oxidation during the curing process and is compatible with the resin.

Epoxy conductive cement makes a very mechanically strong connection between the terminal heads 11 and 12 and the electrodes 4 and 5 in the recesses 2 and 3 and because of the resistance of the epoxy resin to high temperatures such as temperatures up to 700° F., without loss of mechanically axial support, strength and adhesion with the terminals 4 and 5 in the recesses 2 and 3. If solder is used in place of thermosetting cement, the conducting of heat through the stems 13 and 14 and heads 11 and 12 during circuit operation may cause the terminal connections 8 and 10 to move out of position due to the melting or weakening of the solder. This is avoided by using thermosetting cement. Furthermore, by using thermosetting conductive cement, there is no possibility of dissolving or otherwise disintegrating the silver electrode material as might frequently occur if solder were used and where special precautions would have to be taken. Thus the electrodes 4 and 5 may be made of a thinner silver coating than is normally used being more practical and consequently lower cost in manufacturing these capacitors.

The epoxy conductive cement used is a product which consists of silver powder, epoxy resin and a catalyst. The terminal heads 11 and 12 are coated with this epoxy conductive cement 17 and then are placed in the recesses 2 and 3 of the ceramic body 1. The spiral grooves or indentations 15 aid in insuring good adhesion between the terminals head 11 and 12 and the electrodes 4 and 5 respectively. The cemented assembly as shown in FIG. 2 is then placed in an oven at a relatively low temperature for curing the epoxy cement in order to produce mechanically strong homogeneous bond between the electrodes 4 and 5 and the terminals head 11 and 12 respectively.

In order to bring out more clearly the manufacturing process used in making the ceramic capacitors comprising this invention the following example is given. This example is in no way restrictive as to the application of the method comprising this invention but is merely to demonstrate more clearly the method comprising this invention in view of the foregoing.

9300 grams of titanium oxide ($TiO_2$), 350 grams of zirconium oxide ($ZrO_3$), 280 grams of zinc oxide ($ZnO$) and 70 grams of bentonite are thoroughly blended together. A small quantity of phenolic resin is added to act as the temporary binder. A ceramic body is then formed by using a cylinder with piston ends having central protrusions to form the recesses, as explained above. The capacitance may be varied by adjusting the web or center portion thickness which depends, then, on the amount of metallic oxides used and pressure applied in the forming operation.

The molded body is then baked for ten hours at a peak temperature of 2200° F. The first four hours are required to reach the peak temperature. For the next two hours the molded ceramic body is baked at the constant peak temperature of 2200° F. The last four hours are required for the molded body to slowly cool down to room temperature. The resultant baked ceramic body has the following dimensions:

| | Inch |
|---|---|
| Length of body | .180 |
| Diameter of recesses | .076 |
| Outside diameter | .156 |
| Depth of recesses | .075 |
| Thickness of web or central portion between the recesses | .030 |

Shrinkage, based on the ceramic body dimensions before firing, is approximately 15%.

The recesses 2 and 3 are thereafter coated with silver paste to form electrodes as fully described above. The ceramic body is heated first to a low temperature to expel any volatile thinners present in the paste and thereafter heated to a temperature of 1200° F. for twenty minutes to melt the paste and form a homogeneous bond between the metallic silver forming the electrodes and the ceramic. Epoxy conductive cement is applied to the terminal heads which are then placed within the recesses 2 and 3. The assembled capacitor is then baked for one hour at a temperature of 350° F. to cure the cement and form a strong conductive bond between the terminal heads 11 and 12 and the electrodes 4 and 5 respectively.

The resultant capacitor has a capacitance of 6 $\mu\mu f.$ and a temperature coefficient of $-750$ parts/$10^6$/° C. This capacitor has a Q-value at 1.0 mc. of approximately 1500.

The embodiment shown in the drawings and described above is given merely for the purposes of explanation and illustration without intending to limit the scope of the claim to the specific details disclosed. It should be understood that the description of the preferred forms of the invention are for the purpose of complying with Section 112, Title 35 of the U.S. Code and that the claim should be construed as broadly as prior art will permit.

I claim:

A capacitor comprising a cylindrical ceramic body having axial aligned cylindrical recesses in each end thereof, silver fused electrodes coated in each of said recesses, copper wire terminal connections consisting of a solid terminal head having a cylindrical shape with spiral grooves formed by upsetting one end of each of said wire connections by compression coiling, a conductor stem at the other end of said head, said head and stem being an integral continuous copper wire, epoxy conductive cement consisting of a cured silver powder and an epoxy resin and a catalyst securing said terminal heads to said electrodes within said recesses producing a homogeneous bond between said head and said electrode and said ceramic body.

References Cited by the Examiner

UNITED STATES PATENTS

| | | | |
|---|---|---|---|
| 2,527,373 | 10/1950 | Parson | 317—242 |
| 2,569,655 | 10/1951 | Cage | 317—242 |
| 2,627,645 | 2/1953 | Harris | 29—25.42 |
| 2,842,726 | 7/1958 | Robinson | 317—258 |
| 2,915,808 | 12/1959 | Clemons | 29—25.42 |
| 3,086,150 | 4/1963 | Held | 317—258 |

FOREIGN PATENTS 583,493  12/1946  Great Britain.

OTHER REFERENCES

IBM Disclosure Bulletin, vol. 1, No. 3, page 1, October 1958.

BERNARD A. GILHEANY, *Primary Examiner.*

JOHN F. BURNS, *Examiner.*

E. GOLDBERG, *Assistant Examiner.*